(12) United States Patent
Song et al.

(10) Patent No.: US 9,991,071 B2
(45) Date of Patent: Jun. 5, 2018

(54) THIN NOTEBOOK COMPUTER MECHANICAL KEYBOARD

(71) Applicant: HUIZHOU GREETECH ELECTRONICS CO., LTD., Huizhou, Guangdong (CN)

(72) Inventors: Minghua Song, Guangdong (CN); Shangping Yuan, Guangdong (CN)

(73) Assignee: HUIZHOU GREETECH ELECTRONICS CO., LTD., Huizhou, Guangdong (CN)

( * ) Notice: Subject to any disclaimer, the term of this patent is extended or adjusted under 35 U.S.C. 154(b) by 0 days. days.

(21) Appl. No.: 15/528,095

(22) PCT Filed: Jan. 22, 2016

(86) PCT No.: PCT/CN2016/071705
§ 371 (c)(1),
(2) Date: May 18, 2017

(87) PCT Pub. No.: WO2016/138803
PCT Pub. Date: Sep. 9, 2016

(65) Prior Publication Data
US 2018/0047530 A1 Feb. 15, 2018

(30) Foreign Application Priority Data
Mar. 2, 2015 (CN) .......................... 2015 1 0092609

(51) Int. Cl.
*H01H 13/20* (2006.01)
*H01H 13/70* (2006.01)
*G06F 1/16* (2006.01)

(52) U.S. Cl.
CPC ........... *H01H 13/70* (2013.01); *G06F 1/1662* (2013.01); *H01H 13/20* (2013.01); *H01H 2235/01* (2013.01)

(58) Field of Classification Search
CPC ........ H01H 13/70; H01H 13/14; H01H 13/20; H01H 2235/01; G06F 1/1662
(Continued)

(56) References Cited

U.S. PATENT DOCUMENTS 9,741,502 B2 * 8/2017 Zou ........................ H01H 13/70
2013/0334018 A1 12/2013 Hsu

FOREIGN PATENT DOCUMENTS

| CN | 2202968 Y | 7/1995 |
| CN | 102176394 A | 9/2011 |
| CN | 104715952 A | 6/2015 |

* cited by examiner

*Primary Examiner* — Vanessa Girardi
(74) *Attorney, Agent, or Firm* — Winston Hsu

(57) ABSTRACT

A thin notebook computer mechanical keyboard includes a reinforcement iron plate, a scissor structure, a keycap, a base, a pressing stopper, a spring and a cover. The scissor structure includes first positioning parts vertically and movably clamped on clamping parts of the reinforcement iron plate, and second positioning parts. The keycap includes fastening parts fastened on the second positioning parts. When the keycap is pressed to a certain extent, an action between a hand touch and a fourth terminal produces a sound of an upward impact against the cover. When the keycap is pressed, the scissor structure maintains balance of the whole keycap without catching the keycap, which ensures a favorable touch feeling. A switch can be directly installed on a printed circuit board and pass through the reinforcement iron plate. The scissor structure maintains balance of the keycap, and balanced movement is achieved without falling short of thinning requirements.

9 Claims, 5 Drawing Sheets

(58) Field of Classification Search
USPC .......................................................... 200/344
See application file for complete search history.

THIN NOTEBOOK COMPUTER MECHANICAL KEYBOARD

BACKGROUND OF THE INVENTION

1. Field of the Invention

The present disclosure relates to a thin notebook computer mechanical keyboard.

2. Description of the Prior Art

In the current production technology, the conventional portable computer keyboard often includes a scissor structure of a membrane keyboard, and a switch can be switched on or switched off by pressing a button. However, this switch has disadvantages of short service life, slow response, no step feeling and sense of sounds, lack of touch feeling, and large height, which is difficult to meet the thin trend of the portable computer.

SUMMARY OF THE INVENTION

Therefore, it is an objective to provide a thin notebook computer mechanical keyboard with safety, reliability and dustproof function, to solve the problems mentioned above.

In order to achieve the aforementioned objective, the present disclosure discloses a thin notebook computer mechanical keyboard including a reinforcement iron plate arranged on a circuit board. The reinforcement iron plate includes a hollow groove and a plurality of clamping parts at corners. The thin notebook computer mechanical keyboard further includes a scissor structure having a plurality of first positioning parts and a plurality of second positioning parts. The plurality of first positioning parts is vertically and movably clamped on the plurality of clamping parts, and the scissor structure is a hollow structure. The thin notebook computer mechanical keyboard further includes a keycap having a plurality of fastening parts fastened on the plurality of second positioning parts and a base installed on the circuit board. A first terminal, a second terminal, a third terminal and a fourth terminal are installed inside the base. The second terminal is disposed on a lateral side of the first terminal, the third terminal is installed on the first terminal, and the third terminal and the second terminal are disposed oppositely. The third terminal includes a third abutting part extending rearwardly and a third contacting part downwardly bent from the third abutting part and extending toward the second terminal, and the fourth terminal is disposed behind the third terminal. The thin notebook computer mechanical keyboard further includes a pressing stopper installed on the base and movably along a vertical direction, and the pressing stopper includes a pillar extending downwardly and disposed above the third abutting part. The thin notebook computer mechanical keyboard further includes a spring installed on the base, a lower end of the spring abuts against the base, and an upper end of the spring abuts against the pressing stopper. The thin notebook computer mechanical keyboard further includes a cover engaged with the base, and the pressing stopper passes through a slot of the cover.

Furthermore, a first groove, a second groove, a third groove and a fourth groove are sunken from an upper surface of the base downwardly, the second groove is disposed around the first groove, the third groove is disposed behind the second groove and communicated with the second groove, a first thin wall is disposed between the first groove and the second groove, and a constraining groove is disposed on an inner surface of the first thin wall.

Furthermore, the fourth terminal is installed inside the third groove, a protrusion is disposed on an outer wall of the pressing stopper, and the fourth terminal comprises a fourth abutting part extending forwardly and disposed under the protrusion.

Furthermore, the first terminal and the third terminal are installed inside the constraining groove cooperatively.

Furthermore, the reinforcement iron plate includes four clamping parts upwardly protruding from an upper surface of the reinforcement iron plate and bent downwardly.

Furthermore, the scissor structure further includes a first frame and a second frame assembled with the first frame, each first positioning part is disposed at a corner of the first frame, and each second positioning part is disposed at a corner of the second frame.

The reinforcement iron plate is arranged on a circuit board. The reinforcement iron plate includes a hollow groove and a plurality of clamping parts at corners. The scissor structure includes a plurality of first positioning parts and a plurality of second positioning parts. The plurality of first positioning parts is vertically and movably clamped on the plurality of clamping parts, and the scissor structure is a hollow structure. The keycap includes a plurality of fastening parts fastened on the plurality of second positioning parts. When the keycap is pressed to a certain extent, an action between a hand touch and the fourth terminal produces a sound of an upward impact against the cover. Moreover, when the keycap is pressed, the scissor structure maintains balance of the whole keycap without catching the keycap, which ensures a favorable touch feeling. A switch can be directly installed on a printed circuit board and pass through the reinforcement iron plate. The scissor structure maintains balance of the keycap, and balanced movement is achieved without falling short of thinning requirements.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

To illustrate the technical solutions in the embodiments of the present invention or in the prior art more clearly, accompanying drawings needed for describing the embodiments or the prior art are briefly introduced in the following. Obviously, the accompanying drawings in the following description are only some embodiments of the present invention, and persons of ordinary skill in the art may obtain other accompanying drawings from these accompanying drawings without making creative efforts.

DETAILED DESCRIPTION

To make the objectives, technical solutions, and advantages of the present invention more clear, the following clearly and completely describes the technical solutions in the embodiments of the present invention with reference to the accompanying drawings in the embodiments of the present invention. Apparently, the embodiments described are merely part of rather than all of the embodiments of the present invention. All other embodiments obtained by persons of ordinary skill in the art based on the embodiments of the present invention without making creative efforts shall fall within the protection scope of the present invention.

Figure 1:
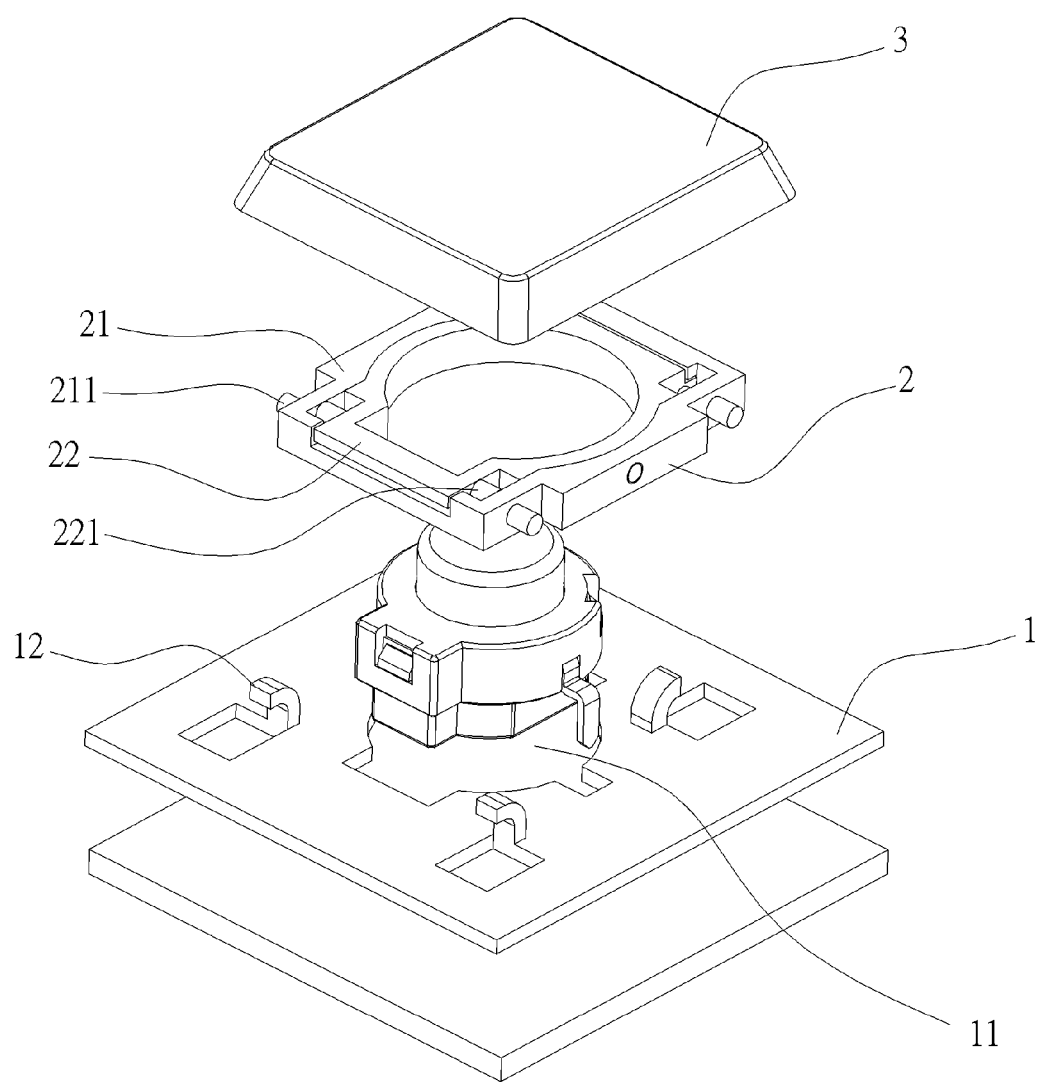
FIG. 1 is an exploded diagram of a thin notebook computer mechanical keyboard according to an embodiment of the present invention.
Figure 2:
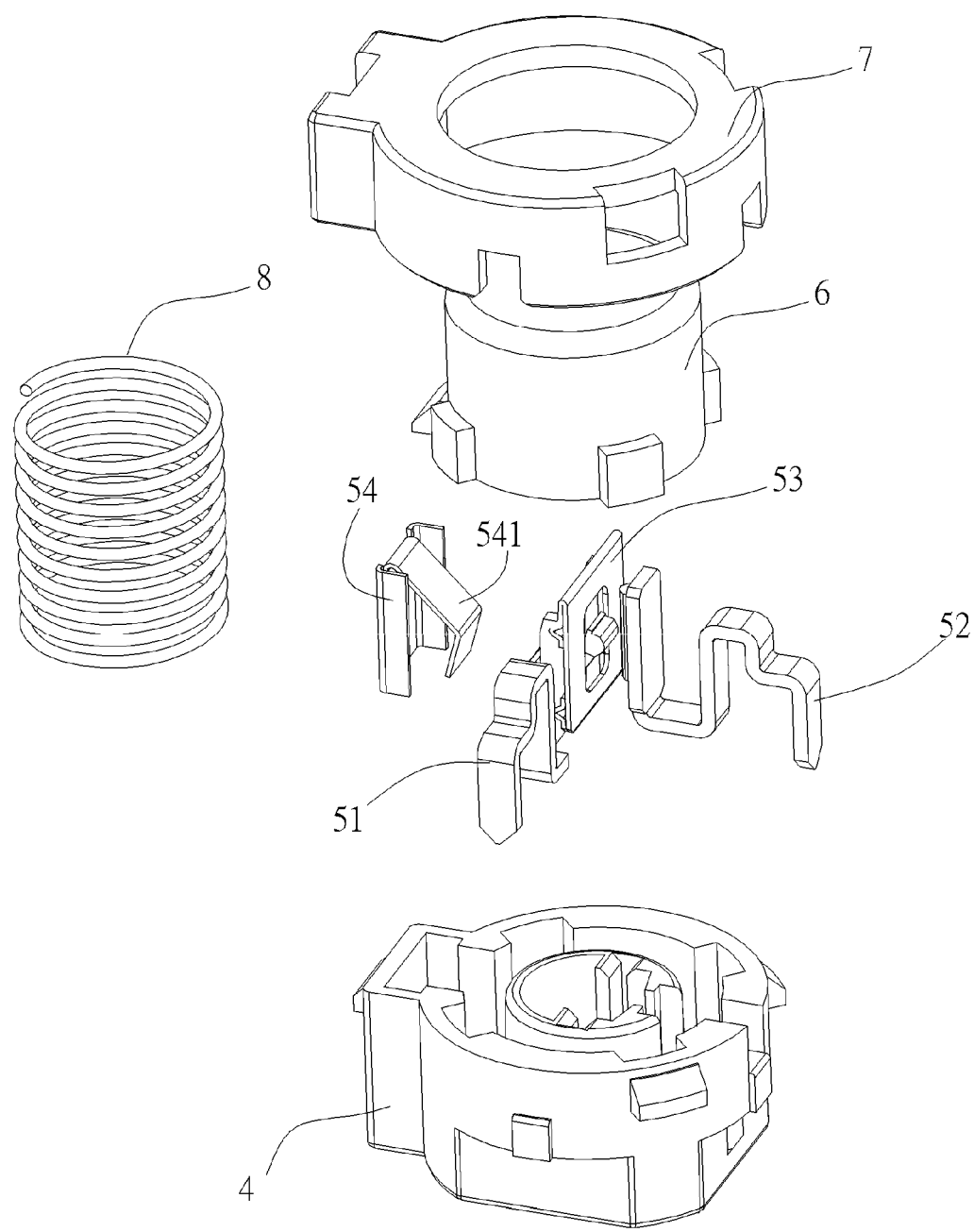
FIG. 2 is a partial exploded diagram of the thin notebook computer mechanical keyboard as shown in FIG. 1 according to the embodiment of the present invention.
Figure 3:
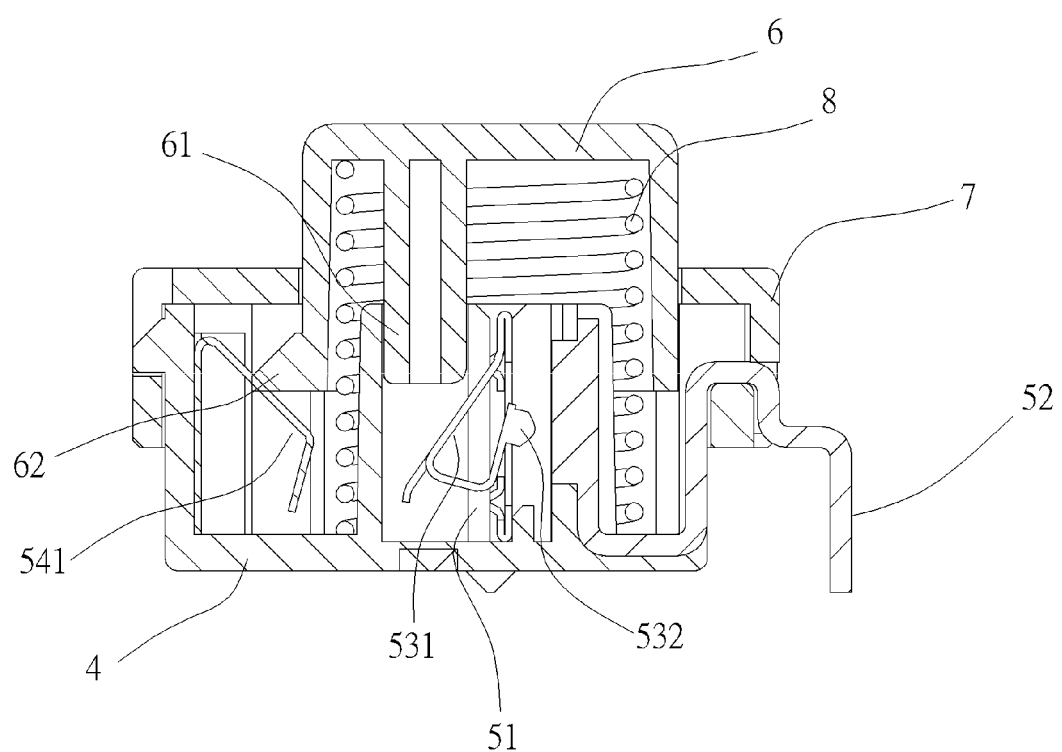
FIG. 3 is a sectional view of the thin notebook computer mechanical keyboard according to the embodiment of the present invention.
Figure 4:
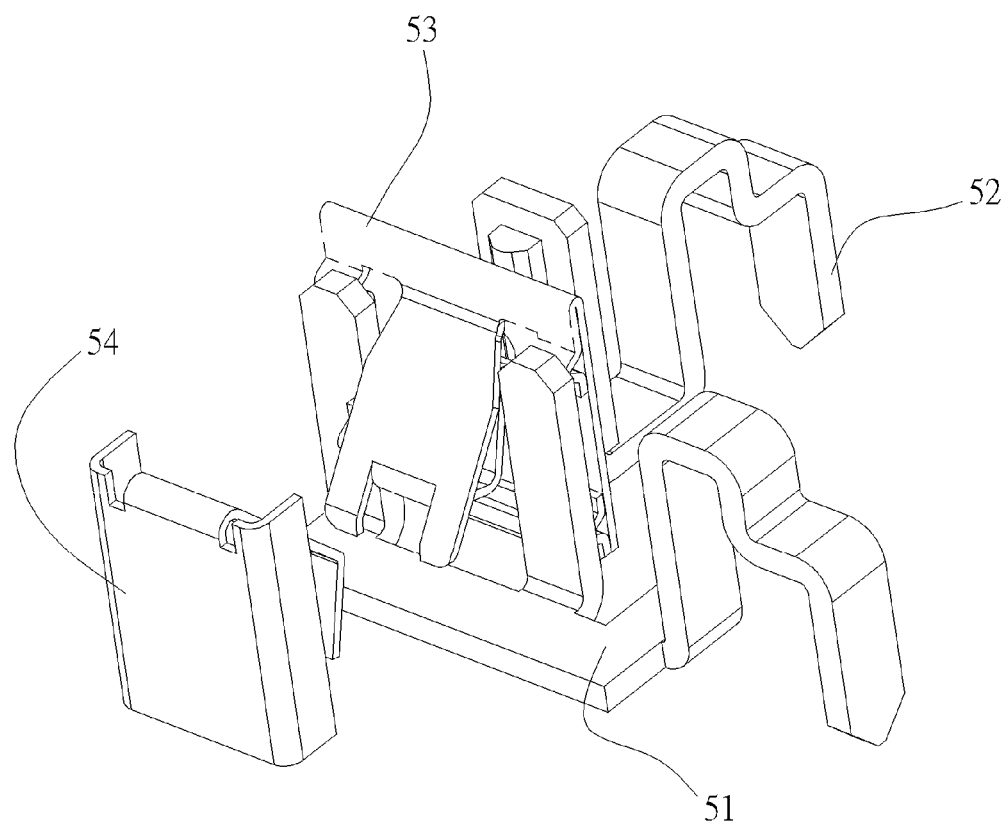
FIG. 4 is an assembly diagram of a first terminal, a second terminal, a third terminal and a fourth terminal according to the embodiment of the present invention.
Figure 5:
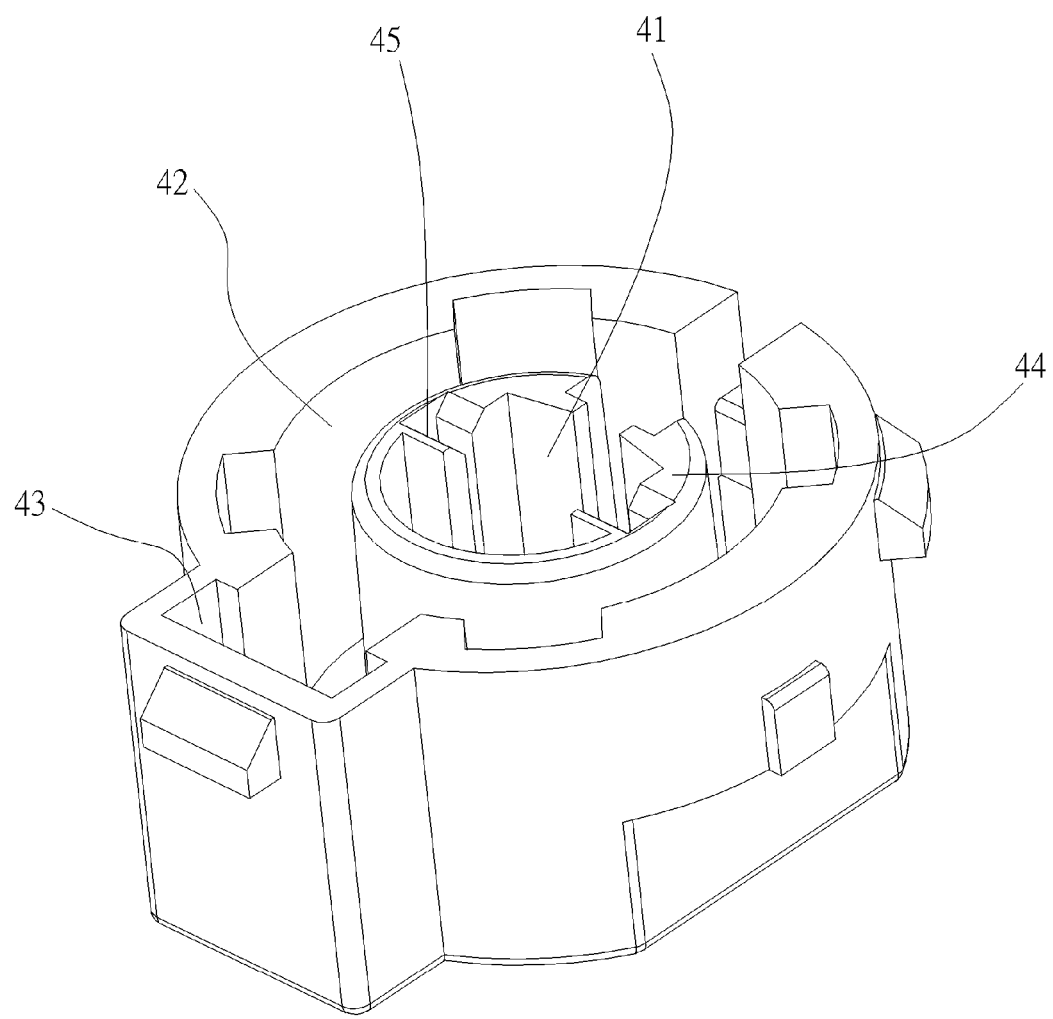
FIG. 5 is a schematic diagram of a base according to the embodiment of the present invention.

Please refer to FIG. 1 to FIG. 5. An embodiment of the present invention provides a thin notebook computer mechanical keyboard including a reinforcement iron plate 1, a scissor structure 2, a keycap 3, a base 4, a pressing stopper 6, a spring 8 and a cover 7.

The reinforcement iron plate 1 is arranged on a circuit board. The reinforcement iron plate 1 includes a hollow groove 11 and a plurality of clamping parts 12 at corners. The hollow groove 11 is disposed on and penetrates a middle portion of the reinforcement iron plate 1 from top to bottom. In this embodiment, the reinforcement iron plate 1 includes four clamping parts 12 upwardly protruding from an upper surface of the reinforcement iron plate 1 and bent downwardly.

The scissor structure 2 includes a plurality of first positioning parts 211 and a plurality of second positioning parts 221. The plurality of first positioning parts 211 is vertically and movably clamped on the plurality of clamping parts 12. The scissor structure 2 includes a first frame 21 and a second frame 22 assembled with the first frame 21. Each first positioning part 211 is disposed at a corner of the first frame 21. Each second positioning part 221 is disposed at a corner of the second frame 22. The scissor structure 2 is a hollow structure.

The keycap 3 includes a plurality of fastening parts fastened on the plurality of second positioning parts 221. Furthermore, the plurality of fastening parts is located at corners of the keycap 3.

The base 4 is installed on the circuit board. A first terminal 51, a second terminal 52, a third terminal 53 and a fourth terminal 54 are installed inside the base 4. The second terminal 52 is disposed on a lateral side of the first terminal 51. The third terminal 53 is installed on the first terminal 51. The third terminal 53 and the second terminal 52 are disposed oppositely. The third terminal 53 includes a third abutting part 531 extending rearwardly. The third terminal 53 further includes a third contacting part 532 downwardly bent from the third abutting part 531 and extending toward the second terminal 52. The fourth terminal 54 is disposed behind the third terminal 53.

The pressing stopper 6 is installed on the base 4 and movably along a vertical direction. The pressing stopper 6 includes a pillar 61 extending downwardly and disposed above the third abutting part 531.

The spring 8 is installed on the base 4. A lower end of the spring 8 abuts against the base 4, and an upper end of the spring 8 abuts against the pressing stopper 6, so as to drive the pressing stopper 6 to move upwardly and to maintain resilient connection of the spring 8, the base 4 and the pressing stopper 6.

The cover 7 is engaged with the base 4. The pressing stopper 6 passes through a slot of the cover 7.

Specifically, a first groove 41, a second groove 42, a third groove 43 and a fourth groove 44 are sunken from an upper surface of the base 4 downwardly. The second groove 42 is disposed around the first groove 41, and the third groove 43 is disposed behind the second groove 42 and communicated with the second groove 42. A first thin wall 44 is disposed between the first groove 41 and the second groove 42. A constraining groove 45 is disposed on an inner surface of the first thin wall 44. The fourth terminal 54 is installed inside the third groove 43. A protrusion 62 is disposed on an outer wall of the pressing stopper 6. The fourth terminal 54 includes a fourth abutting part 541 extending forwardly and disposed under the protrusion 62. The first terminal 51 and the third terminal 53 are installed inside the constraining groove 45 cooperatively.

When the keycap 3 is pressed down, the keycap 3 drives the pressing stopper 6 to move downwardly, the pillar 61 drives the third abutting part 531 to move forwardly, and the third contacting part 532 can be driven to move forwardly accordingly, so as to make the third contacting part 532 and the second terminal 52 contact with each other for accomplishing the electrical conduction of the first terminal 51, the second terminal 52 and the third terminal 53. When the keycap 3 is released from being pressed, the spring 8 drives the pressing stopper 6 to move upwardly, the pillar 6 can be driven to move upwardly accordingly, and the third abutting part 531 can be driven rearwardly, so as to drive the third contacting part 532 to move rearwardly for separating the second terminal 52 and the third terminal 53 and accomplishing disconnection therebetween. When the keycap 3 is pressed to a certain extent, an action between a hand touch and the fourth terminal 54 produces a sound of an upward impact against the cover 74. Moreover, when the keycap 3 is pressed, the scissor structure 2 maintains the balance of the whole keycap 3 without catching the keycap 3, which ensures a favorable touch feeling. A switch can be directly installed on a printed circuit board and pass through the reinforcement iron plate 1. Thus, the scissor structure 2 maintains the balance of the keycap 3, and balanced movement is achieved without falling short of thinning requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thin notebook computer mechanical keyboard:
a reinforcement iron plate arranged on a circuit board, the reinforcement iron plate comprising a hollow groove and a plurality of clamping parts at corners;
a scissor structure comprising a plurality of first positioning parts and a plurality of second positioning parts, the plurality of first positioning parts being vertically and movably clamped on the plurality of clamping parts, and the scissor structure being a hollow structure;
a keycap comprising a plurality of fastening parts fastened on the plurality of second positioning parts;
a base installed on the circuit board, a second terminal and a third terminal being installed inside the base, the third terminal and the second terminal being disposed oppositely, the third terminal comprising a third abutting part extending rearwardly and a third contacting part downwardly bent from the third abutting part and extending toward the second terminal;

a pressing stopper installed on the base and movably along a vertical direction, the pressing stopper comprising a pillar extending downwardly and disposed above the third abutting part; and a spring installed on the base, a lower end of the spring abutting against the base, and an upper end of the spring abutting against the pressing stopper.

2. The thin notebook computer mechanical keyboard of claim 1, wherein the reinforcement iron plate comprises four clamping parts upwardly protruding from an upper surface of the reinforcement iron plate and bent downwardly.

3. The thin notebook computer mechanical keyboard of claim 1, wherein the scissor structure further comprises a first frame and a second frame assembled with the first frame, each first positioning part is disposed at a corner of the first frame, and each second positioning part is disposed at a corner of the second frame.

4. The thin notebook computer mechanical keyboard of claim 1, further comprising a cover engaged with the base, the pressing stopper passing through a slot of the cover.

5. The thin notebook computer mechanical keyboard of claim 1, wherein a first terminal is installed inside the base, the second terminal is disposed on a lateral side of the first terminal, and the third terminal is installed on the first terminal.

6. The thin notebook computer mechanical keyboard of claim 5, wherein a fourth terminal is installed inside the base, a protrusion is disposed on an outer wall of the pressing stopper, and the fourth terminal comprises a fourth abutting part extending forwardly and disposed under the protrusion.

7. The thin notebook computer mechanical keyboard of claim 6, wherein a first groove, a second groove, a third groove and a fourth groove are sunken from an upper surface of the base downwardly, the second groove is disposed around the first groove, the third groove is disposed behind the second groove and communicated with the second groove, a first thin wall is disposed between the first groove and the second groove, and a constraining groove is disposed on an inner surface of the first thin wall.

8. The thin notebook computer mechanical keyboard of claim 7, wherein a fourth terminal is installed inside the third groove and disposed behind the third terminal.

9. The thin notebook computer mechanical keyboard of claim 7, wherein the first terminal and the third terminal are installed inside the constraining groove cooperatively.

* * * * *